(12) United States Patent
Mori et al.

(10) Patent No.: US 8,939,503 B2
(45) Date of Patent: Jan. 27, 2015

(54) HEAD AND NECK PROTECTION APPARATUS FOR VEHICLE

(71) Applicant: Ayako Mori, Sapporo-shi, Hokkaido (JP)

(72) Inventors: Seiichi Mori, Sapporo (JP); Ayako Mori, Sapporo (JP)

(73) Assignee: Ayako Mori, Sapporo-shi, Hokkaido (JP)

( * ) Notice: Subject to any disclaimer, the term of this patent is extended or adjusted under 35 U.S.C. 154(b) by 0 days.

(21) Appl. No.: 14/271,809

(22) Filed: May 7, 2014

(65) Prior Publication Data

US 2014/0333110 A1  Nov. 13, 2014

(30) Foreign Application Priority Data

May 8, 2013 (JP) ................................ 2013-098163

(51) Int. Cl.
  *B60N 2/42* (2006.01)
  *B60N 2/48* (2006.01)
(52) U.S. Cl.
  CPC ............ *B60N 2/4838* (2013.01); *B60N 2/4879* (2013.01)
  USPC .................................... 297/216.12; 297/408
(58) Field of Classification Search
  CPC ...... B60N 2/4885; B60N 2/2839; B60N 2/48; B60N 2/4221; B60R 2021/0048
  USPC ............................................ 297/216.12, 408
  See application file for complete search history.

(56) References Cited

U.S. PATENT DOCUMENTS

| 4,607,885 A * | 8/1986 | del Fierro ...................... 297/397 |
| 7,478,874 B2 * | 1/2009 | Figenser et al. ......... 297/216.13 |
| 2002/0043831 A1 * | 4/2002 | Alsup ....................... 297/216.12 |

FOREIGN PATENT DOCUMENTS

| JP | 11-262427 A | 9/1999 |
| JP | 2006-213253 A | 8/2006 |
| JP | 2007-223548 A | 9/2007 |
| JP | 2011-051526 A | 3/2011 |

* cited by examiner

*Primary Examiner* — Sarah B McPartlin
(74) *Attorney, Agent, or Firm* — Muncy, Geissler, Olds & Lowe, P.C.

(57) ABSTRACT

An object is to provide a head and neck protection apparatus for vehicle which is simple in a structure and an operation principle and excellent in reliability and safety and can protect the head and neck part by alleviating not only a rearward impact received by the head part at a rear-end collision but also a forward impact.

A head and neck protection apparatus for vehicle according to the present invention is attached to a vehicle seat, provided with a fixed frame having a mounting stay, a swing frame swingably connected with respect to the fixed frame, and a lock stopper for locking the swing frame with respect to the fixed frame, in which the swing frame has a rear-head part contact member with which the rear head part is brought into contact and a front-head part buffer member alleviating an impact of the front head part.

5 Claims, 6 Drawing Sheets

HEAD AND NECK PROTECTION APPARATUS FOR VEHICLE

BACKGROUND OF THE INVENTION

1. Field of the Invention

The present invention relates to an apparatus for protecting the head and neck of an occupant onboard a vehicle subjected to a rear-end collision and particularly to a head and neck protection apparatus for vehicle suitable for use instead of a headrest in an automobile.

2. Description of the Related Art

Conventionally, if an automobile is subjected to a rear-end collision while an occupant is onboard, the head part of the occupant is strongly hit onto a headrest behind, and after that, the head part is largely thrown forward in many cases. And these continuous impacts both in forward and rearward directions might cause damages to the head and neck parts such as a bruise on the head part or cervical sprain called a whiplash injury.

In order to alleviate the above described rearward impact, Japanese Patent Laid-Open No. 2011-51526, for example, discloses an airbag device for head protection provided with an airbag embedded inside the headrest and inflated and deployed to a vehicle front side from the headrest; and a cushion material arranged in contact with a surface on the vehicle front side of the airbag inside the headrest and cleaved open at inflation/deployment of the airbag, in which the airbag has a main chamber inflated and deployed to the vicinity of the headrest or from the vicinity of the headrest to the vicinity of a shoulder portion of the seatback and a sub chamber extended in either one of or both of a vertical direction or a transverse direction of the main chamber. According to this Japanese Patent Laid-Open No. 2011-51526, it is described that, since the sub chamber is inflated and deployed in the vertical direction of the main chamber, the head part of the occupant can be protected for a wider range.

Moreover, Japanese Patent Laid-Open No. 11-262427 discloses a movable headrest in which an impact absorbing slit with a width smaller than a diameter of a support pin is provided in a reinforcing plate rotatably supporting the support pin of a ratchet plate in the movable headrest incorporating a ratchet mechanism composed of the ratchet plate rotatably provided on a headrest stay through the reinforcing plate and a lock member provided in a headrest frame so that a claw portion of this ratchet plate and a lock gear are meshed with each other. According to this Japanese Patent Laid-Open No. 11-262427, it is described that, when a collision accident such as a rear-end collision occurs in a vehicle, even if the head part of the occupant rapidly collides with the headrest, the support pin of the ratchet plate moves rearward while pushing open a slit width of the impact absorbing slit and thus, the headrest is plastically deformed as appropriate and retreats rearward, whereby a repulsion force to the head part of the occupant can be reduced, and an impact load applied to the head part of the occupant is effectively absorbed.

SUMMARY OF THE INVENTION

However, the airbag device disclosed in Japanese Patent Laid-Open No. 2011-51526 and the movable headrest disclosed in Japanese Patent Laid-Open No. 11-262427 only slightly alleviate an impact when the rear head part of an occupant is hit onto the headrest behind at a rear-end collision. Thus, there is a problem that the impact that the head part is thrown forward after the rear head part is hit onto the headrest cannot be alleviated.

Moreover, both of the devices described above have complicated structures, and there is also a problem of a concern of a failure and shortage of reliability or safety on a correct operation in the case of emergency or the like. Moreover, once the devices function, it takes time and a cost to recover the devices to the original state, which is also a problem.

The present invention was made in order to solve such problems and has an object to provide a head and neck protection apparatus for vehicle which is simple in its structure and operation principle, is excellent in reliability and safety and can protect the head and neck part by alleviating not only a rearward impact received by the head part at a rear-end collision but also a forward impact.

The head and neck protection apparatus for vehicle according to the present invention is a head and neck protection apparatus for vehicle attached to a vehicle seat having an insertion hole of a headrest stay, provided with a fixed frame having a mounting stay that can be inserted into the insertion hole of the vehicle seat, a swing frame swingably connected around a predetermined rotating shaft with respect to this fixed frame, and a lock stopper for locking the swing frame at a predetermined initial position with respect to the fixed frame, in which the swing frame has a rear-head part contact member provided below the rotating shaft at the initial position and with which the rear head part is brought into contact and a front-head part buffer member provided above the rotating shaft at the initial position and alleviating an impact of the front head part, and the lock stopper has a locking force which unlocks the swing frame by a load received by the rear-head part contact member from the rear head part.

As an aspect of the present invention, the fixed frame may have a rear-head part buffer member for alleviating an impact of the rear head part at a front position of the rear-head part contact member in the swing frame locked at the initial position.

As an aspect of the present invention, the swing frame is composed of a lower frame to which the rear-head part contact member is attached and an upper frame to which the front-head part buffer member is attached, and the upper frame may be inclined forward with respect to the lower frame.

As an aspect of the present invention, the head and neck protection apparatus for vehicle may have a swing regulating member for regulating swing of the swing frame at the swing position where the front-head part buffer member can alleviate the impact on the front head part.

As an aspect of the present invention, the lock stopper may have an engagement portion formed having a superior-arc cylindrical shape with an inner diameter substantially equal to an outer diameter of the lower frame.

According to the head and neck protection apparatus for vehicle of the present invention, the apparatus is simple in its structure and operation principle, is excellent in reliability and safety and can protect the head and neck part by alleviating not only a rearward impact received by the head part at a rear-end collision but also a forward impact.

DETAILED DESCRIPTION OF THE PREFERRED EMBODIMENTS

An embodiment of a head and neck protection apparatus for vehicle according to the present invention will be described below by using the attached drawings. In the present invention, the vehicle is a concept including all the vehicles having an insertion hole for a headrest stay in a vehicle seat such as an ordinary automobile, a large-sized automobile, a truck and the like. Moreover, the head and neck part in the present invention is a concept including a general portion from the head part to the neck part.

Figure 1:
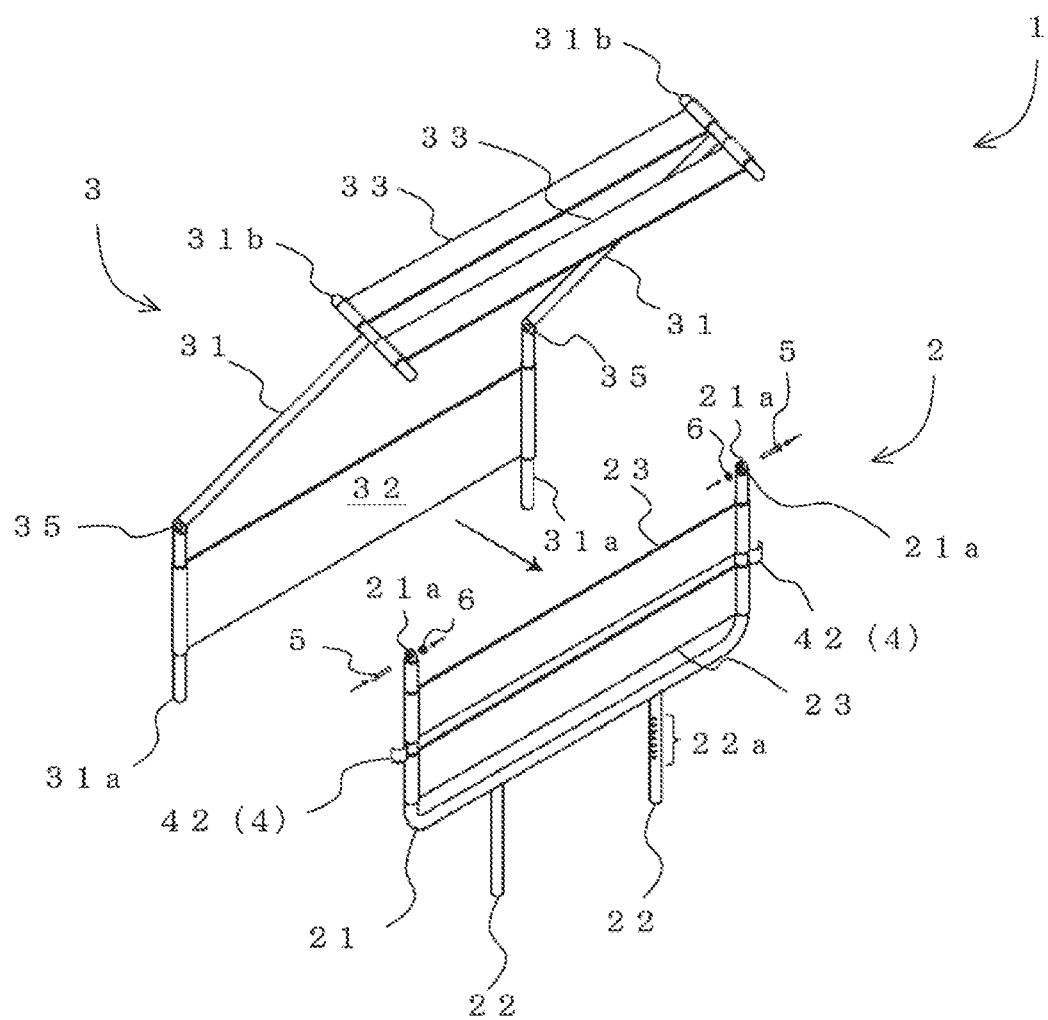
FIG. 1 is an exploded perspective view illustrating an embodiment of a head and neck protection apparatus for vehicle according to the present invention.
Figure 2:
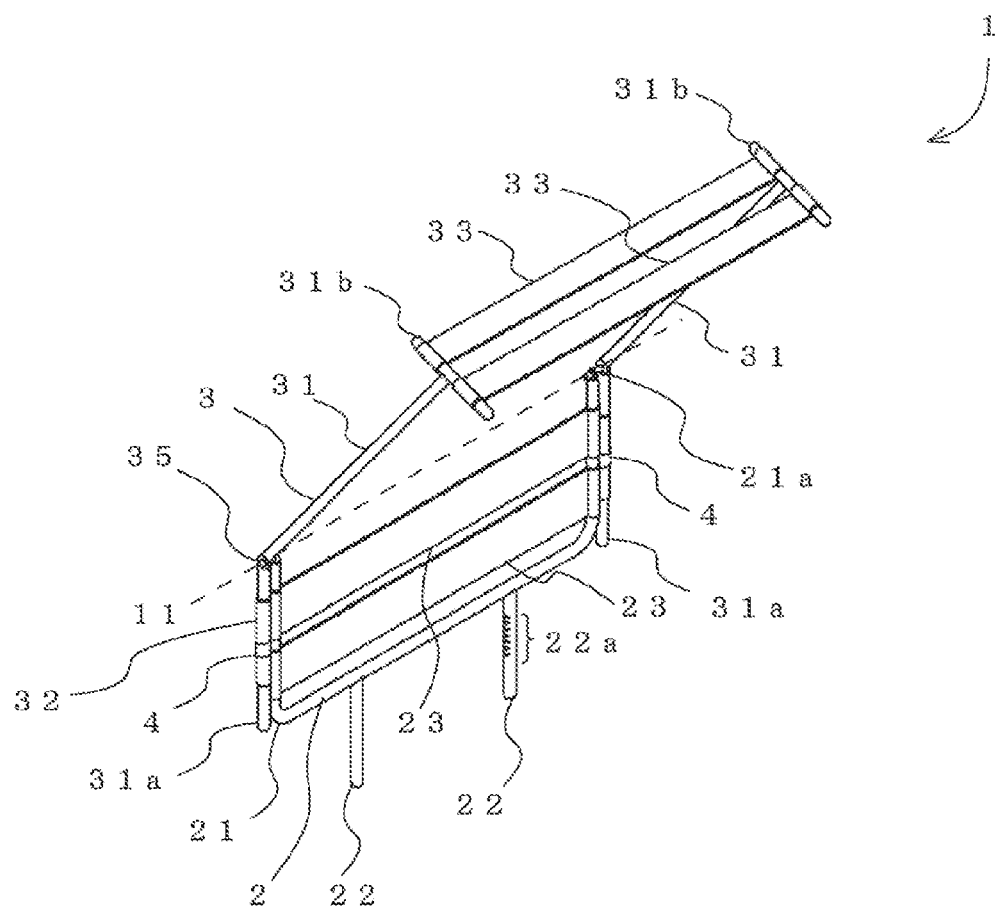
FIG. 2 is a perspective view illustrating the head and neck protection apparatus for vehicle in a state in which a swing frame is locked at an initial position in this embodiment.
Figure 3:
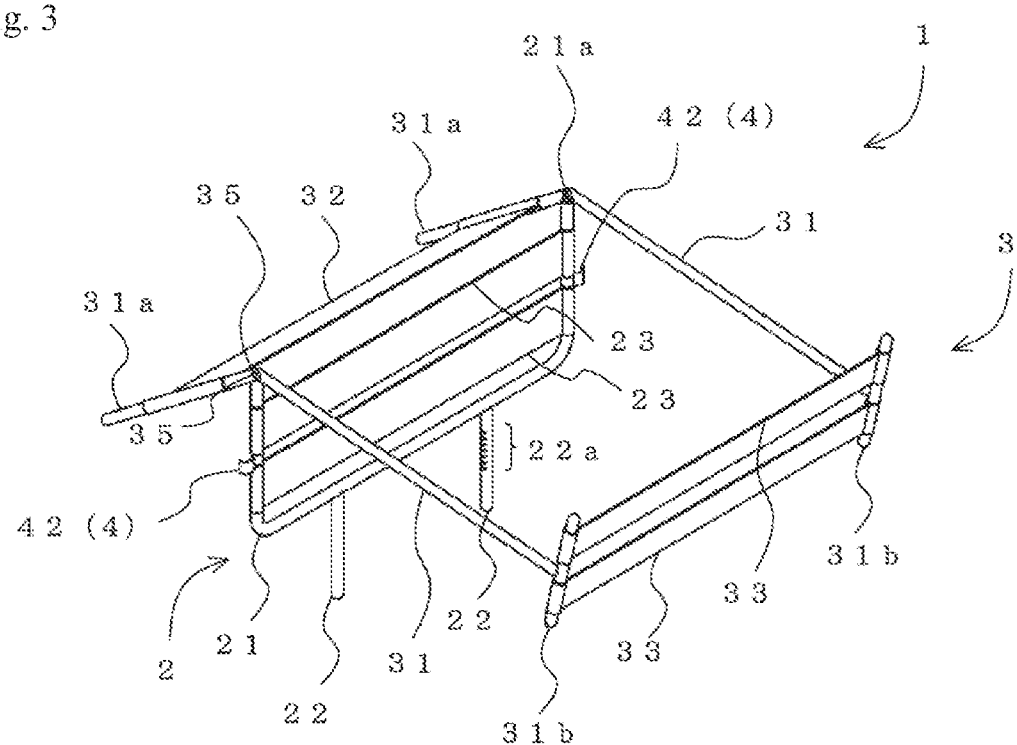
FIG. 3 is a perspective view illustrating the head and neck protection apparatus for vehicle in a state in which the swing frame has been unlocked in this embodiment.

A head and neck protection apparatus for vehicle 1 according to this embodiment is attached to a vehicle seat in order to protect the head and neck part of an occupant at a vehicle accident or particularly at a collision from behind and is composed mainly of a fixed frame 2 having a mounting stay 22 which can be inserted into an insertion hole (not shown) of the vehicle seat, a swing frame 3 swingably connected around a predetermined rotating shaft 11 with respect to this fixed frame 2, and a lock stopper 4 for locking the swing frame 3 with respect to the fixed frame 2 at a predetermined initial position as illustrated in FIGS. 1 to 3. A configuration according to this embodiment will be described below in detail.

The fixed frame 2 of the head and neck protection apparatus for vehicle 1 according to this embodiment is composed of a fixed frame body 21, a pair of mounting stays 22 and 22, and a rear-head part buffer member 23 for alleviating an impact of the rear head part as illustrated in FIGS. 1 to 3.

The fixed frame body 21 according to this embodiment is formed having a substantially U-shape of a pipe material opened upward as illustrated in FIG. 1. Moreover, each of upper end portions of the fixed frame body 21 has connection holes 21a formed therein for swingably connecting the swing frame 3 around the predetermined rotating shaft 11, respectively, as illustrated in FIG. 2. In this embodiment, the predetermined rotating shaft 11 is set in parallel with a straight line connecting a pair of insertion holes provided in a vehicle seat, that is, in a direction substantially orthogonal to a traveling direction of the vehicle.

The pair of mounting stays 22 and 22 are made of the pipe material formed each having a rod shape similarly to the fixed frame body 21 and are fixed to a bottom part of the fixed frame body 21 at an interval equal to the insertion holes as illustrated in FIGS. 1 to 3. Moreover, each of the mounting stays 22 has a plurality of recess portions 22a formed at predetermined intervals in a height direction as illustrated in FIGS. 1 to 3. Each of the recess portions 22a formed in each of the mounting stays 22 is for adjusting a height position when the fixing frame 2 is to be attached to the vehicle seat. Each of the recess portions 22a is locked by a holding rod (not shown) for a headrest provided on an upper part of the vehicle seat so that the height position of the fixed frame 2 is adjusted. Since this mounting stay 22 is used by replacing a headrest originally attached on the upper part of the vehicle seat, the mounting stay preferably has the same configuration as that of the headrest stay in a normal headrest.

The rear-head part buffer member 23 is a member for alleviating an impact of the rear head part and is formed of an extendable belt-shaped member, as illustrated in FIGS. 1 to 3. In this embodiment, the rear-head part buffer member 23 is composed of two cushion belts 23 and 23 as illustrated in FIGS. 1 to 3 and is fixed by extending over the fixed frame body 21 in a substantially horizontal direction. Thus, the rear-head part buffer member 23 is arranged at a front position of a rear-head part contact member 32 in the swing frame 3 locked at the initial position which will be described later.

Subsequently, the swing frame 3 is composed of a swing frame body 31, the rear-head part contact member 32 with which the rear head part is brought into contact, and a front-head part buffer member 33 for alleviating an impact of the front head part as illustrated in FIGS. 1 to 3. By means of the swing frame 3, a structure and an operation principle are simple, and reliability and safety are excellent and thus, not only the rearward impact received by the head part at a rear-end collision but also the forward impact are alleviated so as to protect the head and neck part.

The swing frame body 31 is composed of a lower frame 31a to which the rear-head part contact member 32 is attached and an upper frame 31b to which the front-head part buffer member 33 is attached as illustrated in FIGS. 1 to 3. The lower frame 31a is made of a pair of pipe materials formed each having a rod shape, and the upper frame 31b is made of a pair of pipe materials formed each having substantially a T-shape.

Each of the upper frames 31b and 31b is inclined forward with respect to each of the lower frames 31a and 31a as illustrated in FIGS. 1 to 3 so that the front-head part buffer member 33 does not interfere with a field of view during a normal time, and the front-head part buffer member 33 can reliably protect the front head part at a rear-end collision. Moreover, a connection portion 35 between each of the lower frames 31a and 31a and each of the upper frames 31b and 31b is swingably connected to the connection hole 21a provided on an end portion of the fixed frame body 21 by a bolt 5 and a nut 6 as illustrated in FIGS. 1 to 3. As a result, the swing frame 3 is configured so as to swing around the rotating shaft 11 with respect to the fixed frame 2.

The rear-head part contact member 32 is made of a flat plate-shaped member as illustrated in FIG. 1 and is extended between each of the lower frames 31b and 31b. In this embodiment, with the rear-head part contact member 32, the rear head part of an occupant is indirectly brought into contact through the rear-head part buffer member 23 provided in the fixed frame 2. That is, the "contact" in the present invention is a concept including not only direct contact but also indirect contact with something interposed therebetween.

Moreover, in this embodiment, as described above, the rear-head part buffer member 23 is provided in the fixed frame body 21, but this configuration is not limiting. That is, if the rear-head part contact member 32 is formed of an elastic material or an impact absorbing material that can alleviate an impact of some degree and also can transmit a load that can unlock the lock stopper 4, the rear-head part buffer member 23 does not necessarily have to be provided.

The front-head part buffer member 33 is a member for alleviating an impact of the front head part and is composed of an extendable belt-shaped member similarly to the rear-head part buffer member 23 as illustrated in FIGS. 1 to 3. In this embodiment, the front-head part buffer member 33 is composed of the two cushion belts 33 and 33 as illustrated in FIGS. 1 to 3, and is extended and fixed in the substantially horizontal direction between the T-shaped lateral rod portions provided on the upper end portions of each of the upper frames 31b and 31b.

In the head and neck protection apparatus for vehicle 1 of this embodiment, a swing regulating member 34 for regulating swing of the swing frame 3 is provided at a swing position where the front-head part buffer member 33 can alleviate an impact of the front head part in order to prevent swing of the front-head part buffer member 33 to the vicinity of the neck part of the occupant. The swing position that can alleviate the impact of the front head part is a position where the front-head part buffer member 33 can be brought into contact with the front head part thrown forward by reaction of a rear-end collision, and a state in which the front-head part buffer member 33 is located in front of the forehead of the occupant slightly inclined forward is preferable.

Figure 5A:
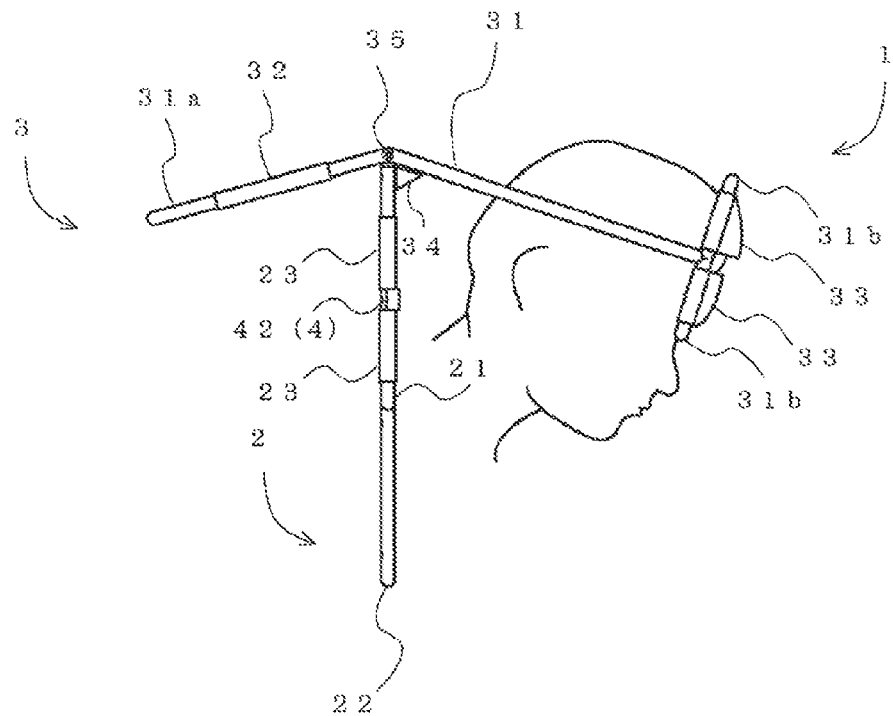
FIG. 5A is a side view illustrating a swing regulating member in contact with a base end portion of an upper frame in this embodiment.
Figure 5B:
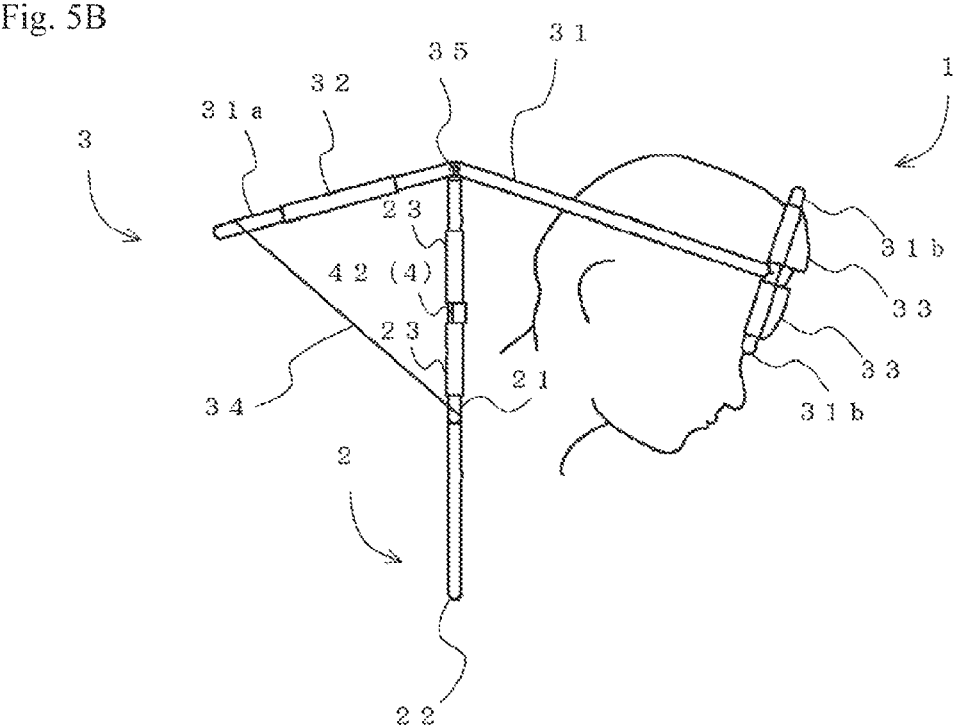
FIG. 5B is a side view illustrating the swing regulating member by a string material in this embodiment.

The swing regulating member 34 may be a member provided on the upper end portion of the fixed frame body 21 and in contact with a base end portion of the upper frame 31b as illustrated in FIG. 5A as long as it can regulate swing of the swing frame 3. The swing regulating member 34 may be a string material or the like which connects the fixed frame body 21 and the lower end portion of the lower frame 31a as illustrated in FIG. 5B.

Figure 4:
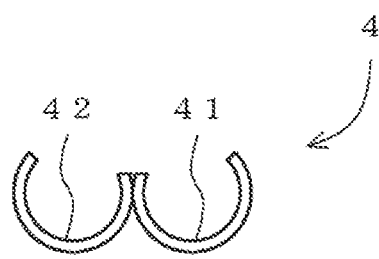
FIG. 4 is a plan view illustrating a lock stopper in this embodiment.

Subsequently, the lock stopper 4 is a member for locking the swing frame 3 with respect to the fixed frame 2 as illustrated in FIG. 2. In this embodiment, the lock stopper 4 has a fixed portion 41 fixed to the fixed frame body 21 and an engagement portion 42 engaged with the lower frame 31a as illustrated in FIG. 4.

The engagement portion 42 of the lock stopper 4 is formed having a superior-arc cylindrical shape with an inner diameter substantially equal to an outer diameter of the lower frame 31a as illustrated in FIGS. 1 to 4 and is fixed so as to be open rearward. Thus, by strongly pushing the lower frame 31a into the engagement portion 42a, the engagement is completed, and the swing frame 3 is locked at a predetermined position. In this embodiment, the fixed portion 41 is formed having the same shape as that of the engagement portion 42, but this configuration is not limiting, and the fixed portion 41 may have any shape as long as it can be fixed to the fixed frame body 21.

In this embodiment, the lock stopper 4 locks the swing frame 3 to the fixed frame 2 at a position where each of the lower frames 31a and 31a of the swing frame 3 is in parallel with a pair of support portions extended in a perpendicular direction from the bottom part of the fixed frame body 21 of the fixed frame 2, and the front-head part buffer member 33 is arranged above the head part as illustrated in FIG. 2. In the present invention, the lock position is assumed to be the "predetermined initial position".

Moreover, in this embodiment, a locking force of the lock stopper 4 is designed to such a degree that the swing frame 3 is unlocked by a load received by the rear-head part contact member 32 from the rear head part at a rear-end collision. More specifically, the locking force is set to such a degree that unlocking is performed only by a load larger than the load when the occupant leans the head part on the rear-head part contact member 32 during a normal time.

In this embodiment, an extendable cushion belt is used for the rear-head part buffer member 23 and the front-head part buffer member 33 but this is not limiting. For example, it can be changed as appropriate to a plurality of extendable string-shaped bodies provided in parallel, for example, as long as they can alleviate/absorb the impact of the rear head part and the front head part.

Moreover, in this embodiment, the extendable cushion belts are extended two each for the rear-head part buffer member 23 and the front-head part buffer member 33 but they are not limiting, and the number of belts may be, for example, one or three or more and can be changed as appropriate as long as a sufficient size is ensured as a whole to alleviate/absorb the impact of the rear head part and the front head part.

Moreover, in this embodiment, a flat plate-shaped member is used for the rear-head part contact member 32, but this is not limiting, and, for example, a cloth-state member or a member having extendibility may be used, and it can be changed as appropriate to those which can transmit a load larger than the locking force of the lock stopper 4 to the rear-head part contact member 32 when it impacts the rear head part of the occupant at a rear-end collision accident.

Moreover, in this embodiment, the engagement portion 42 formed having a slight superior-arc is used for the lock stopper 4, but this is not limiting. It may be a ring-shaped member which is opened only when a load at a predetermined value or more is applied, for example, and it can be changed to anything as appropriate as long as it has a locking force to such a degree that the lock is released by a predetermined load. However, the lock stopper 4 is preferably reusable so that it can be locked again even if it is unlocked at a rear-end collision accident.

Moreover, in this embodiment, a metal pipe material is used for the fixed frame body 21, the mounting stay 22, and the swing frame body 31, but this is not limiting. They may be formed of a resin material such as plastic as long as it has sufficient rigidity, for example. On the contrary, in order to give sufficient strength, a columnar metal material or the like may be used, and a change can be made as appropriate.

Subsequently, an operation of the head and neck protection apparatus for vehicle 1 according to this embodiment will be described.

When the head and neck protection apparatus for vehicle 1 of this embodiment is to be used, first, a headrest originally attached to the upper part of the vehicle seat is removed. Then, by inserting the mounting stay 22 into the insertion hole into which the headrest stay has been inserted, the recess portion 22a is locked by the holding rod for the headrest, and the head and neck protection apparatus for vehicle 1 is attached to the vehicle seat.

Figure 6A:
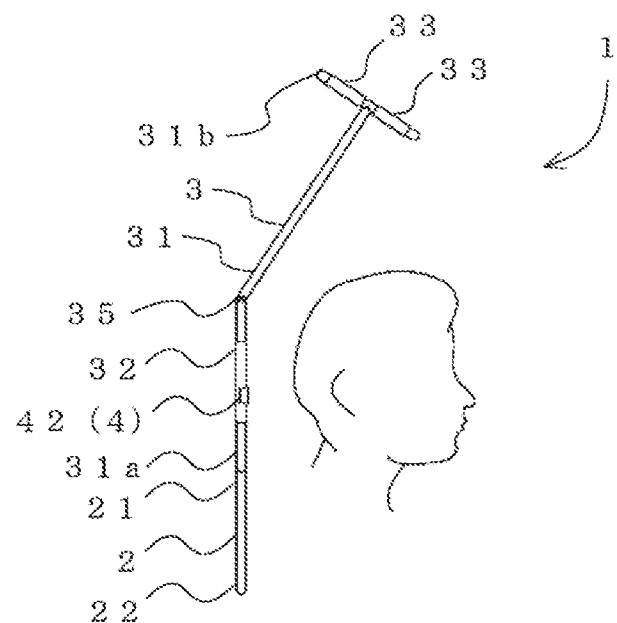
FIG. 6A is a side view illustrating an instance in which the swing frame is at the initial position in this embodiment.

In the head and neck protection apparatus for vehicle 1 attached to the vehicle seat, the lock stopper 4 locks the swing frame 3 with respect to the fixed frame 2 at the initial position during a normal time as illustrated in FIG. 6A. As a result, the rear-head part contact member 32 is arranged just behind the rear head part, and the front-head part buffer member 33 is arranged slightly above the front head part.

Figure 6B:
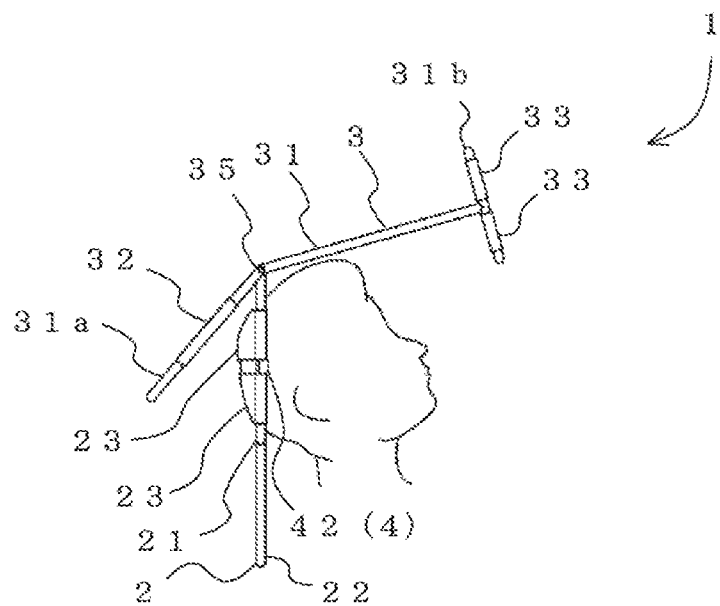
FIG. 6B is a side view illustrating an instance in which the rear head part is brought into contact with a rear-head part contact member in this embodiment.

When a rear-end collision accident occurs, as illustrated in FIG. 6B, the head part of the occupant receives a rearward impact. At this time, the rear-head part buffer member 23 regulates rearward movement of the rear head part and also absorbs the impact by its extendable force. Thus, the rearward impact received by the head and neck part immediately after the rear-end collision is alleviated, and a risk of damage is reduced.

Moreover, the rear head part is brought into contact with the rear-head part contact member 32 through the rear-head part buffer member 23 substantially at the same time as alleviation of the impact by the rear-head part buffer member 23 and gives a rearward load. As a result, the rear-head part contact member 32 receives the load from the rear head part and tries to swing the swing frame 3 around the rotating shaft 11. At this time, if the load exceeds the locking force of the lock stopper 4, as illustrated in FIG. 6B, the lock stopper 4 unlocks the swing frame 3 and swings the swing frame 3 forward around the rotating shaft 11.

On the other hand, if the load from the rear head part is smaller than the locking force of the lock stopper 4, the lock stopper 4 holds a state in which the swing frame 3 is locked at the initial position. Thus, if the head part erroneously touches the rear-head part contact member 32 or at a light rear-end collision accident, malfunction of the swing frame 3 is prevented.

Figure 6C:
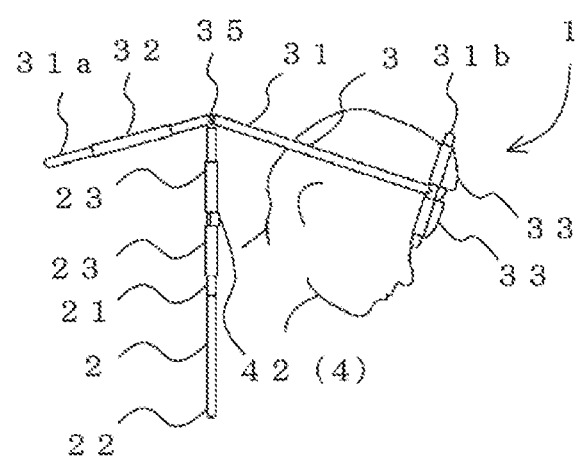
FIG. 6C is a side view illustrating an instance in which a front-head part buffer member alleviates an impact of the front head part in this embodiment.

As described above, after the rearward impact is alleviated by the rear-head part buffer member 23, the head part is thrown forward by its reaction as illustrated in FIG. 6C. At this time, the unlocked swing frame 3 automatically swings around the rotating shaft 11 and arranges the front-head part buffer member 33 at the front position of the forehead of the occupant slightly inclined forward. Thus, the front-head part buffer member 33 regulates the movement of the head part thrown forward and absorbs the impact by its extendable force. Then, the forward impact received by the head and neck part is alleviated by the reaction at the collision, and swing of the head part in the longitudinal direction is suppressed to the minimum, and thus, a risk of damage on the head and neck part is further reduced.

Moreover, if the impact of a rear-end collision is large, the load of the rear head part brought into contact with the rear-head part contact member 32 becomes large, and the swing frame 3 quickly swings and is arranged at the front position of the forehead of the occupant. As described above, since a speed of longitudinal movement of the head part of the occupant changes depending on the intensity of the impact at the rear-end collision, the swing frame 3 can be configured to move in accordance with the intensity of the impact of the collision.

Moreover, in this embodiment, since the upper frame 31b is inclined forward with respect to the lower frame 31a, the front-head part buffer member 33 does not shield the field of view of the occupant at the initial position and is instantaneously arranged in the vicinity of the front head part of the occupant at a rear-end collision. Thus, such a situation that swinging of the front-head part buffer member 33 is delayed at a rear-end collision and fails to alleviate a forward impact can be prevented.

Moreover, in this embodiment, the swing regulating member 34 regulates swing of the swing frame 3 at an optimal position for the front-head part buffer member 33 to alleviate the impact of the front head part. Thus, the forward impact is reliably alleviated by a reaction of a rear-end collision, and the front-head part buffer member 33 is prevented from swinging too much to the vicinity of the neck part of the occupant.

As described above, after the head and neck part is safely protected by the head and neck protection apparatus for vehicle 1, only by returning the swing frame 3 to the initial position and by pushing the lower frame 31a into the engagement portion 42 of the lock stopper 4, the swing frame 3 is locked by the fixed frame 2. Thus, the swing frame 3 does not interfere with the field of view even after the collision accident, and the vehicle can be moved immediately.

As described above, according to the present invention, the following working effects can be exerted:

1. Not only a rearward impact received by the head part at a rear-end collision but also a forward impact can be absorbed/alleviated, and the head and neck part can be protected.
2. The structure and operation principle are simple, and reliability and safety can be improved.
3. Injuries in the front head part and the rear head part or cervical damage caused by an impact on the front head part and the rear head part can be prevented.
4. During a normal time, interference by the front-head part buffer member 33 with operation, scenery and the like can be prevented.
5. At a rear-end collision, the front-head part buffer member 33 can be arranged in the vicinity of the front head part quickly and reliably.
6. Since the lock stopper 4 can be reused even after being unlocked, the swing frame 3 can be quickly locked at the initial position after an accident.
7. The swing regulating member 34 can regulate the swing of the swing frame 3 at an optimal position and effectively alleviate an impact of the front head part and also can prevent arrangement of the swing frame 3 in the vicinity of the neck part.
8. The apparatus can be used only by being inserted into the insertion hole of the headrest stay and can be attached to the vehicle seat easily and rapidly even by elderly people or women.

The head and neck protection apparatus for vehicle 1 according to the present invention is not limited to the above described embodiment but is changeable as appropriate.

For example, the lock stopper 4 having the engagement portion 42 is used for locking the swing frame 3 at the initial position immediately also after a rear-end collision in the above described embodiment, but this configuration is not limiting. For example, a string material fractured by a tensile load at a predetermined value or more may be used as the lock stopper 4 so that the lower frame 31a is connected to the fixed frame body 21 by the string material.

REFERENCE SIGNS LIST 1 head and neck protection apparatus for vehicle
11 rotating shaft
2 fixed frame
21 fixed frame body
21a connection hole
22 mounting stay
22a recess portion
23 rear-head part buffer member
3 swing frame
31 swing frame body
31a lower frame
31b upper frame
32 rear-head part contact member
33 front-head part buffer member
34 swing regulating member
35 connection portion
4 lock stopper
41 fixed portion
42 engagement portion
5 bolt
6 nut

What is claimed is:
1. A head and neck protection apparatus for vehicle attached to a vehicle seat having an insertion hole of a headrest stay, comprising:

a fixed frame having a mounting stay that can be inserted into the insertion hole of the vehicle seat;

a swing frame swingably connected around a predetermined rotating shaft with respect to the fixed frame; and a lock stopper for locking the swing frame at a predetermined initial position with respect to the fixed frame, wherein the swing frame has a rear-head part contact member provided with which a rear head part is brought into contact and a front-head part buffer member for alleviating an impact of a front head part, and the rear-head part contact member is provided below the rotating shaft at the initial position, and the front-head part buffer member is provided above the rotating shaft at the initial position; and the lock stopper unlocks the swing frame if a load that the lock stopper receives from the rear head part through the swing frame exceeds a locking force of the lock stopper.

2. The head and neck protection apparatus for vehicle according to claim 1, wherein the fixed frame has a rear-head part buffer member for alleviating an impact of the rear head part at a front position of the rear-head part contact member in the swing frame locked at the initial position.

3. The head and neck protection apparatus for vehicle according to claim 1, wherein the swing frame is composed of a lower frame to which the rear-head part contact member is attached and an upper frame to which the front-head part buffer member is attached, and the upper frame is inclined forward with respect to the lower frame.

4. The head and neck protection apparatus for vehicle according to claim 1, comprising:

a swing regulating member for regulating swing of the swing frame at a swing position where the front-head part buffer member can alleviate the impact on the front head part.

5. The head and neck protection apparatus for vehicle according to claim 3, wherein the lock stopper has an engagement portion formed having a cylindrical shape that has, on a circuular side thereof, an opening which extends from one end to the other end in an axis direction thereof and whose central angle is less than 180° and has an inner diameter substantially equal to an outer diameter of the lower frame.

* * * * *